(12) United States Patent
Ueki

(10) Patent No.: US 11,780,347 B2
(45) Date of Patent: Oct. 10, 2023

(54) CHARGING CONNECTOR CONNECTION DETERMINING METHOD AND CHARGING CONNECTOR CONNECTION DETERMINING APPARATUS

(71) Applicant: SUBARU CORPORATION, Tokyo (JP)

(72) Inventor: Takahiro Ueki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 211 days.

(21) Appl. No.: 17/324,224

(22) Filed: May 19, 2021

(65) Prior Publication Data

US 2021/0376524 A1    Dec. 2, 2021

(30) Foreign Application Priority Data

May 27, 2020  (JP) .................................. 2020-092159

(51) Int. Cl.
*B60L 53/66*  (2019.01)
*B60L 53/16*  (2019.01)

(52) U.S. Cl.
CPC .............. *B60L 53/66* (2019.02); *B60L 53/16* (2019.02); *H01R 2201/26* (2013.01)

(58) Field of Classification Search
CPC .... B60L 538/66; B60L 53/16; H01R 2201/26
USPC ......................................................... 320/104
See application file for complete search history.

(56) References Cited

U.S. PATENT DOCUMENTS

| | | |
|---|---|---|
| 2010/0213896 A1 | 8/2010 | Ishii et al. |
| 2019/0143824 A1* | 5/2019 | Aburai .................... B60L 53/30 70/255 |
| 2019/0375300 A1* | 12/2019 | Lyon ...................... B60L 53/16 |
| 2020/0398684 A1* | 12/2020 | Motomiya ....... H01R 13/62944 |
| 2020/0398685 A1* | 12/2020 | Motomiya ............. B60L 53/16 |

FOREIGN PATENT DOCUMENTS

| | | |
|---|---|---|
| JP | 2009-71989 A | 4/2009 |
| JP | 2010-283944 A | 12/2010 |
| JP | 2016-63695 A | 4/2016 |

* cited by examiner

*Primary Examiner* — Suchin Parihar
(74) *Attorney, Agent, or Firm* — TROUTMAN PEPPER HAMILTON SANDERS LLP

(57) ABSTRACT

A charging connector connection determining method includes providing a locking pin at a charging inlet of an electric vehicle, in which the locking pin is configured to move to be in a first state that allows for attachment, to the charging inlet, of a charging connector provided at an end of a charging cable, a second state in which the locking pin is positioned more in an advancing direction than the first direction to be engaged with the charging connector, and a third state in which the locking pin is positioned more in the advancing direction than the second state and prevents the charging connector from being attached to the charging inlet, and determining presence of coupling of the charging connector to the charging inlet, by moving the locking pin in the advancing direction and detecting a state of the locking pin among the first, second, and third states.

7 Claims, 8 Drawing Sheets

CHARGING CONNECTOR CONNECTION DETERMINING METHOD AND CHARGING CONNECTOR CONNECTION DETERMINING APPARATUS

CROSS-REFERENCE TO RELATED APPLICATIONS

The present application claims priority from Japanese Patent Application No. 2020-092159 filed on May 27, 2020, the entire contents of which are hereby incorporated by reference.

BACKGROUND

The technology relates to a charging connector connection determining method and a charging connector connection determining apparatus.

There has been an increasing demand for a vehicle that has an electric storage device as a drive source, such as an electric car or a plug-in hybrid car (hereinafter may also be simply referred to as an "electric vehicle"). With the increase in demand, a technique has been developed that allows for charging of the electric storage device by means of a power supply provided outside the vehicle (hereinafter may also be simply referred to as an "external power supply"), by coupling a charging inlet provided in the electric vehicle and the external power supply together via a charging cable. For example, a plug-in vehicle has been developed that allows for charging of the electric storage device by means of a general household power supply.

SUMMARY

An aspect of the technology provides a charging connector connection determining method that includes: providing a locking pin at a charging inlet of an electric vehicle, in which the locking pin is configured to be advanced and retracted in an axial direction and engage with a charging connector to lock an engagement between the locking pin and the charging connector, and the charging connector is provided at an end of a charging cable, and in which the locking pin is configured to move to be in a first state that allows for attachment of the charging connector to the charging inlet, a second state in which the locking pin is positioned more in an advancing direction than the first direction to be engaged with the charging connector, and a third state in which the locking pin is positioned more in the advancing direction than the second state and prevents the charging connector from being attached to the charging inlet; and determining presence of coupling of the charging connector to the charging inlet, by moving the locking pin in the advancing direction and detecting a state of the locking pin among the first state, the second state, and the third state.

An aspect of the technology provides a charging connector connection determining apparatus to be provided in an electric vehicle and configured to determine presence of coupling of a charging inlet of the electric vehicle and a charging connector provided at an end of a charging cable. The charging connector connection determining apparatus includes a locking pin, a pin driver, and a processor. The locking pin is provided at the charging inlet, and configured to be advanced and retracted in an axial direction and engage with the charging connector to lock an engagement between the locking pin and the charging connector. The pin driver is configured to advance and retract the locking pin. The processor is coupled to the pin driver. The locking pin is configured to move to be in a first state that allows for attachment of the charging connector to the charging inlet, a second state in which the locking pin is positioned more in an advancing direction than the first direction to be engaged with the charging connector, and a third state in which the locking pin is positioned more in the advancing direction than the second state and prevents the charging connector from being attached to the charging inlet. The processor is configured to determine the presence of the coupling of the charging connector to the charging inlet, by activating the pin driver to move the locking pin in the advancing direction and detecting a state of the locking pin among the first state, the second state, and the third state.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
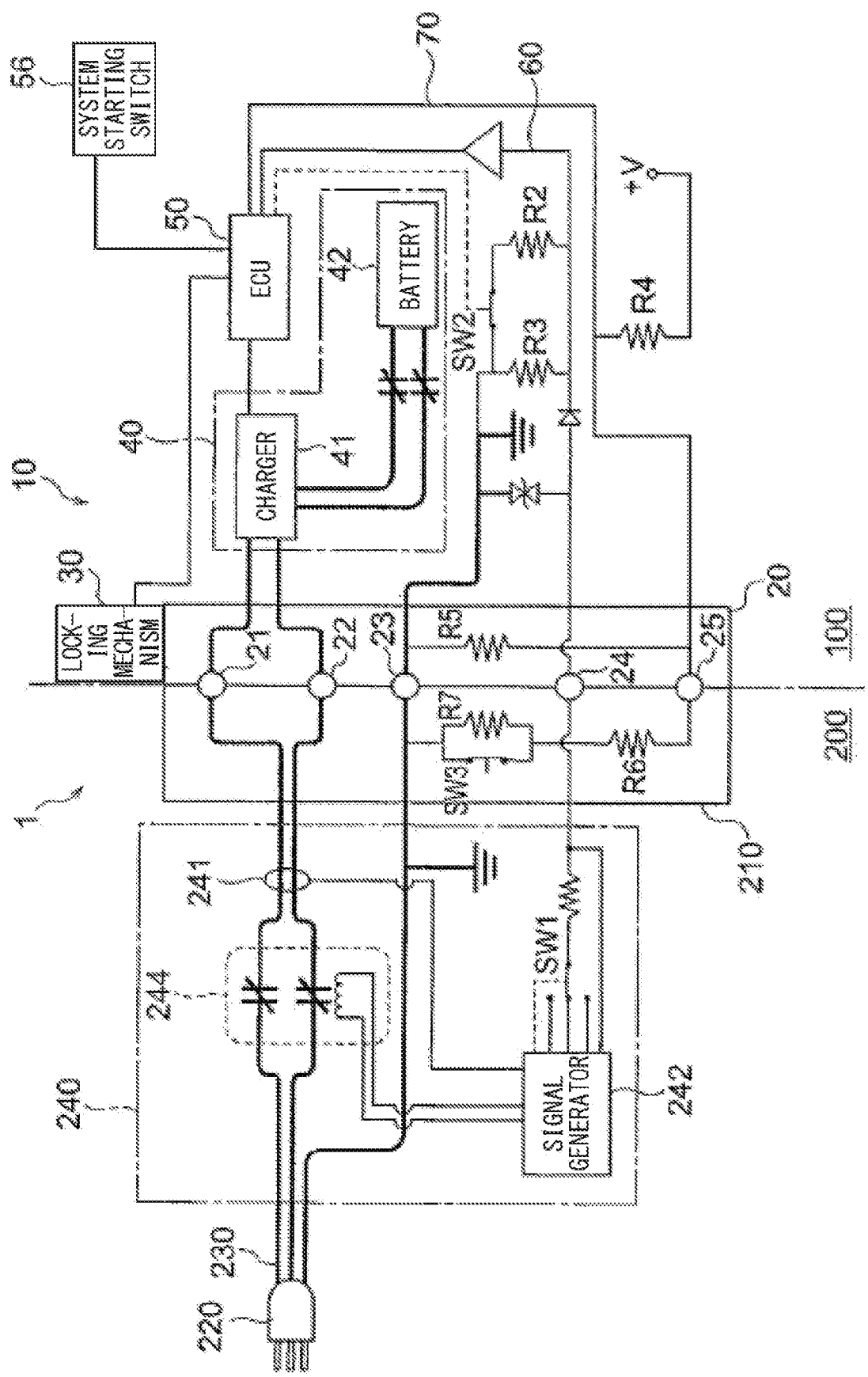
FIG. 1 is a diagram illustrating an example of a configuration of a charging system having a charging connector connection determining apparatus according to one example embodiment of the technology.

Some plug-in vehicles have a locking mechanism that locks coupling of a connector of a charging cable (hereinafter may also be simply referred to as a "charging connector") to a charging inlet of a vehicle with the charging connector being coupled to the charging inlet, in order to prevent the charging cable from being released from the vehicle upon charging. For example, reference is made to Japanese Unexamined Patent Application Publication (JP-A) No. 2016-63695.

Some plug-in vehicles detect the presence of the coupling of the vehicle and the charging cable in a state in which the vehicle and an external power supply are coupled together via the charging cable, in order to prevent traveling of the vehicle with the charging cable still being coupled, i.e., with the charging cable being dragged (hereinafter may also be simply referred to as "drag traveling"). A control pilot signal transferred between the vehicle and the external power supply and a cable connection signal outputted on the basis of a state of coupling of the charging inlet of the vehicle and the charging connector are used to detect the presence of the coupling of the vehicle and the charging cable.

For example, JP-A No. 2009-71989 discloses a charging controlling apparatus for a vehicle that determines the coupling state of the charging cable, whether supplying of electric power from the external power supply to the vehicle is possible, etc., on the basis of the control pilot signal. The charging controlling apparatus also detects the presence of the coupling of the charging cable on the basis of the cable connection signal. JP-A No. 2010-283944 discloses a technique that prohibits traveling of a vehicle in a case where the charging cable is detected as being coupled to the vehicle.

A vehicle having the charging controlling apparatus that allows for transfer of the control pilot signal and the cable connection signal detects the presence of the coupling of the charging cable on the basis of those signals, and disables traveling of the vehicle in a case where the coupling of the charging cable is detected. With this configuration, the vehicle having the charging controlling apparatus prevents the drag traveling that drags the charging cable.

However, in the above configuration, a power supply of a control pilot circuit that transfers the control pilot signal is based on the external power supply. Hence, it is not possible to detect the coupling of the charging cable even when the charging cable is coupled to the vehicle, in a case where a plug of the charging cable is released from the external power supply.

In addition, it is not possible to perform detection of a coupling state of the charging cable that uses the cable connection signal even when the charging connector is coupled to the charging inlet of the vehicle, in a case where a cable connection circuit that transfers the cable connection signal has a disconnection.

Accordingly, a technique that detects the coupling of the charging cable by means of the control pilot signal and the cable connection signal can allow the vehicle to travel even through the charging cable is coupled to the vehicle. In particular, the technique can allow a vehicle having a locking mechanism of the charging connector to travel, with an engagement of the charging connector being still locked. What is desired is a technique that makes it possible to determine the presence of the coupling of the charging connector with high reliability.

It is desirable to provide a charging connector connection determining method and a charging connector connection determining apparatus that make it possible to determine the presence of coupling of a charging connector to an electric vehicle with higher reliability.

In the following, some example embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

FIG. 1 illustrates a configuration of a charging system 1 having a charging connector connection determining apparatus 10 according to an example embodiment of the technology. The charging connector connection determining apparatus 10 may be adapted to be provided in an electric vehicle 100 that has an electric storage device 40 as a drive source, such as an electric car or a plug-in hybrid car.

The charging system 1 may perform charging based on an alternating current (AC) on the electric storage device 40 provided in the electric vehicle 100 by means of electric power supplied from a charging cable 200. The charging cable 200 may be coupled to an AC power supply provided outside the electric vehicle 100. The charging system 1 may include: the electric vehicle 100; an unillustrated power feeding device provided outside the electric vehicle 100 (hereinafter may also be referred to as an "external power supply"); and the charging cable 200 that couples the external power supply and the electric vehicle 100 together. In the following description, the electric vehicle 100 may also be simply referred to as a "vehicle 100".

The charging cable 200 may have a first end and a second end. The first end may have a charging connector 210 to be coupled to a charging inlet 20 of the vehicle 100. The second end may have a plug 220 to be coupled to an outlet of the external power supply. The charging cable 200 may have a power cable 230 and a control unit 240. The power cable 230 may supply, from the external power supply, the electric power to the electric storage device 40 provided in the electric vehicle 100. The control unit 240 may be provided in the charging cable 200 and control the charging.

The control unit 240 may include a ground-fault circuit interrupter 241 and a signal generator 242. The signal generator 242 may generate a control pilot signal (hereinafter may also be referred to as a "CPLT signal"). The CPLT signal may be a pulse signal that is based on, for example, a rated current feedable to the vehicle 100 from the power feeding device that serves as the external power supply. The CPLT signal may be subjected to transmission and reception between the power feeding device and the vehicle 100 by a control pilot circuit 62 illustrated in FIG. 2. A value of a duty ratio of the CPLT signal may be set on the basis of a capacity of a current feedable to the vehicle 100 from the external power supply via the charging cable 200. The value of the duty ratio of the CPLT signal may be set in advance for each charging cable 200. The control unit 240 may also include a cutoff mechanism 244 that opens a relay through an excitation line to cut off the electric power, in a case where the signal generator 242 has detected a malfunction such as a disconnection or an electric leakage.

Figure 3:
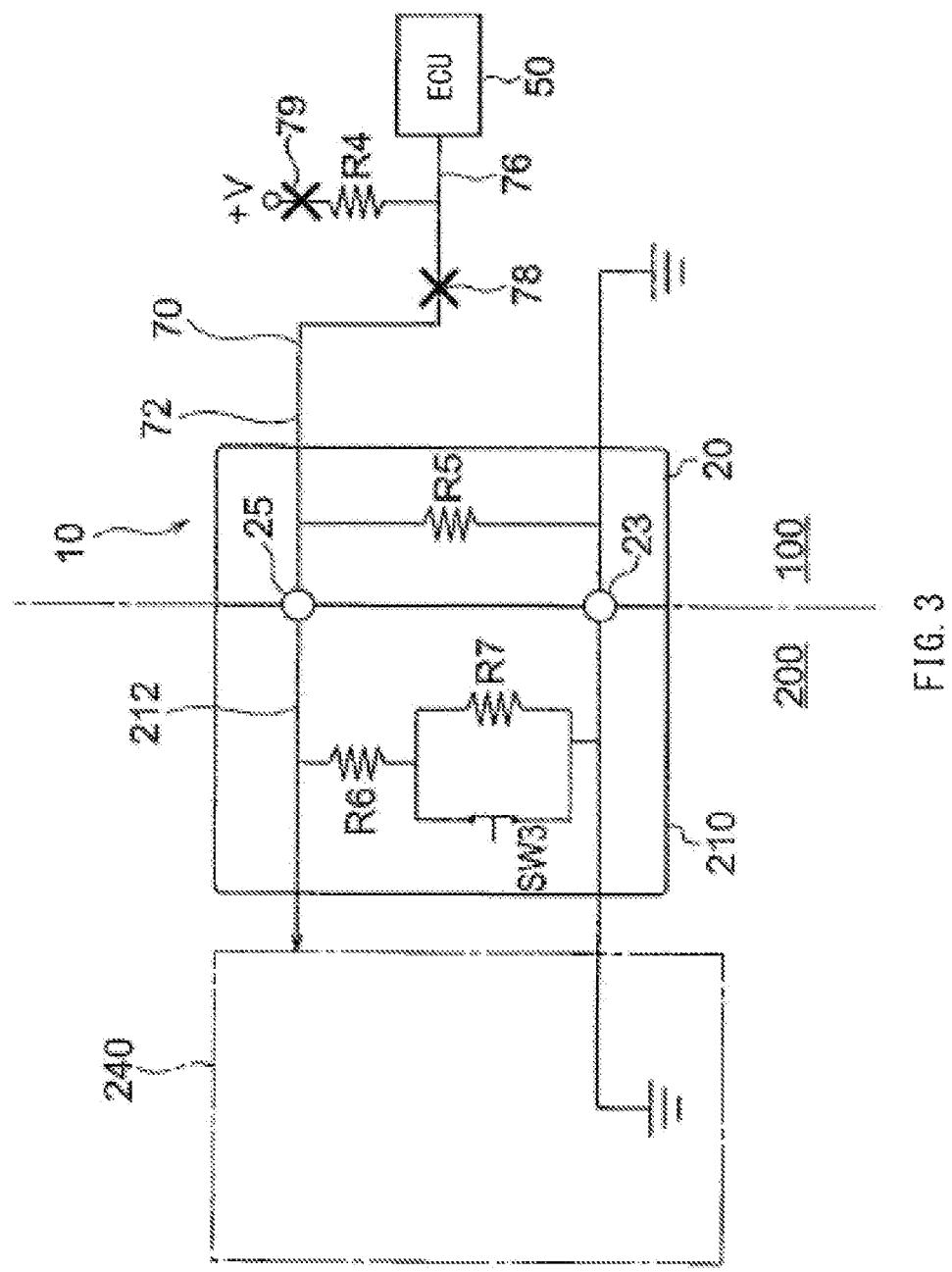
FIG. 3 is a diagram illustrating an example of a cable connection circuit in the charging system illustrated in FIG. 1.

The charging connector 210 may include a connection detecting path 212 as illustrated in FIGS. 1 and 3. The connection detecting path 212 may have a switch SW3 and a resistor R6. The switch SW3 may have a first end that is grounded, and may be coupled in parallel with a resistor R7. The resistor R6 may be coupled in series with the resistor R7 and the switch SW3. The connection detecting path 212 may structure a circuit that detects a state of coupling of the charging connector 210 to the charging inlet 20, and may output a cable connection signal (hereinafter may also be referred to as a "PISW signal") corresponding to the coupling state.

The charging connector connection determining apparatus 10 provided in the electric vehicle 100 may include: the charging inlet 20 to which the charging connector 210 is to be coupled; the electric storage device 40; an electronic control unit (ECU) 50; a control pilot signal path 60 that transfers the CPLT signal (hereinafter may also be referred to as a "CPLT signal path 60"); and a cable connection signal path 70 that transfers the PISW signal (hereinafter may also be referred to as a "PISW signal path 70"). In one embodiment, the ECU 50 may serve as a "processor". The charging connector connection determining apparatus 10 may also include: a charging lid 28 that opens and closes the charging inlet 20; a locking mechanism 30 provided at the charging inlet 20; and a system starting switch 56 that starts a traveling system. The traveling system may allow the vehicle 100 to travel. The ECU 50 may be electrically coupled to the charging lid 28, the locking mechanism 30, the electric storage device 40, the system starting switch 56, the CPLT signal path 60, and the PISW signal path 70.

Figure 4:
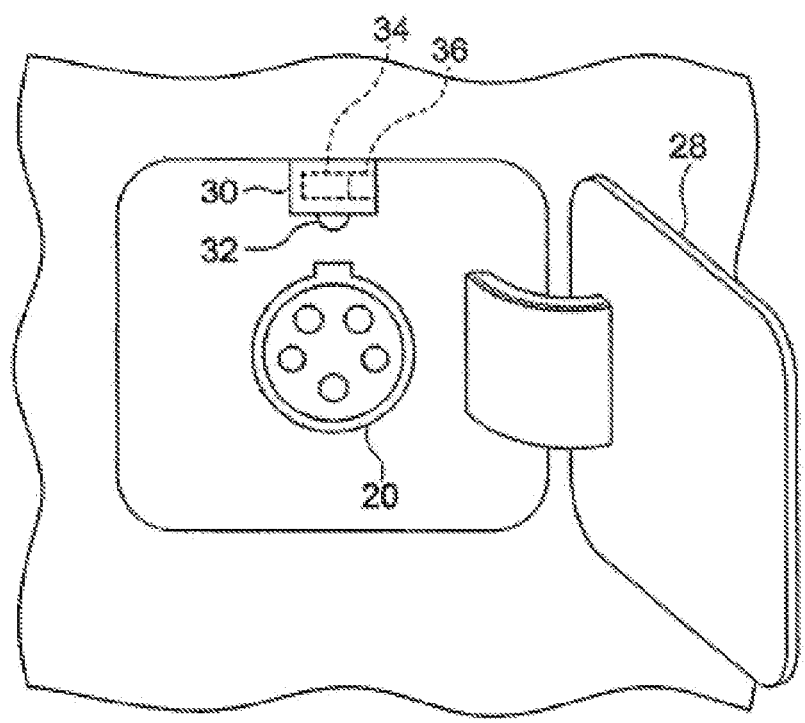
FIG. 4 is a diagram illustrating an example of an inlet container including a charging inlet.

The charging inlet 20 may receive insertion of the charging connector 210, allowing the charging connector 210 to be coupled to the charging inlet 20. In an example embodiment, the charging inlet 20 may be provided in an inlet container provided on a body of the vehicle 100 as illustrated in FIG. 4. The charging inlet 20 may have connection terminals 21, 22, 23, 24, and 25 to be coupled to respective terminals of the charging connector 210 as illustrated in FIG. 1.

The electric storage device 40 may include a charger 41 and a battery 42. The charger 41 may convert AC electric power supplied from the charging inlet 20 into direct current (DC) electric power and supply the DC electric power to the battery 42. The battery 42 may be a secondary battery such as a nickel-metal hydride battery or a lithium-ion battery. In an example embodiment, the electric storage device 40 may be charged by the electric power supplied in the charging system 1 via the connection terminals 21 and 22.

The CPLT signal path 60 may be adapted to transmit and receive the CPLT signal between the vehicle 100 and the power feeding device. The CPLT signal path 60 may structure the control pilot circuit 62 that outputs and transfers the CPLT signal, with the power feeding device and the vehicle 100 being coupled via the charging cable 200. The CPLT signal may be a control signal subjected to a process such as a pulse-width modulation or a voltage adjustment on the basis of, for example: a state of coupling of the charging cable 200 that couples the vehicle 100 and the power feeding device together; whether supplying of electric power from the power feeding device to the vehicle 100 is possible; or a rated current of the power feeding device.

Figure 2:
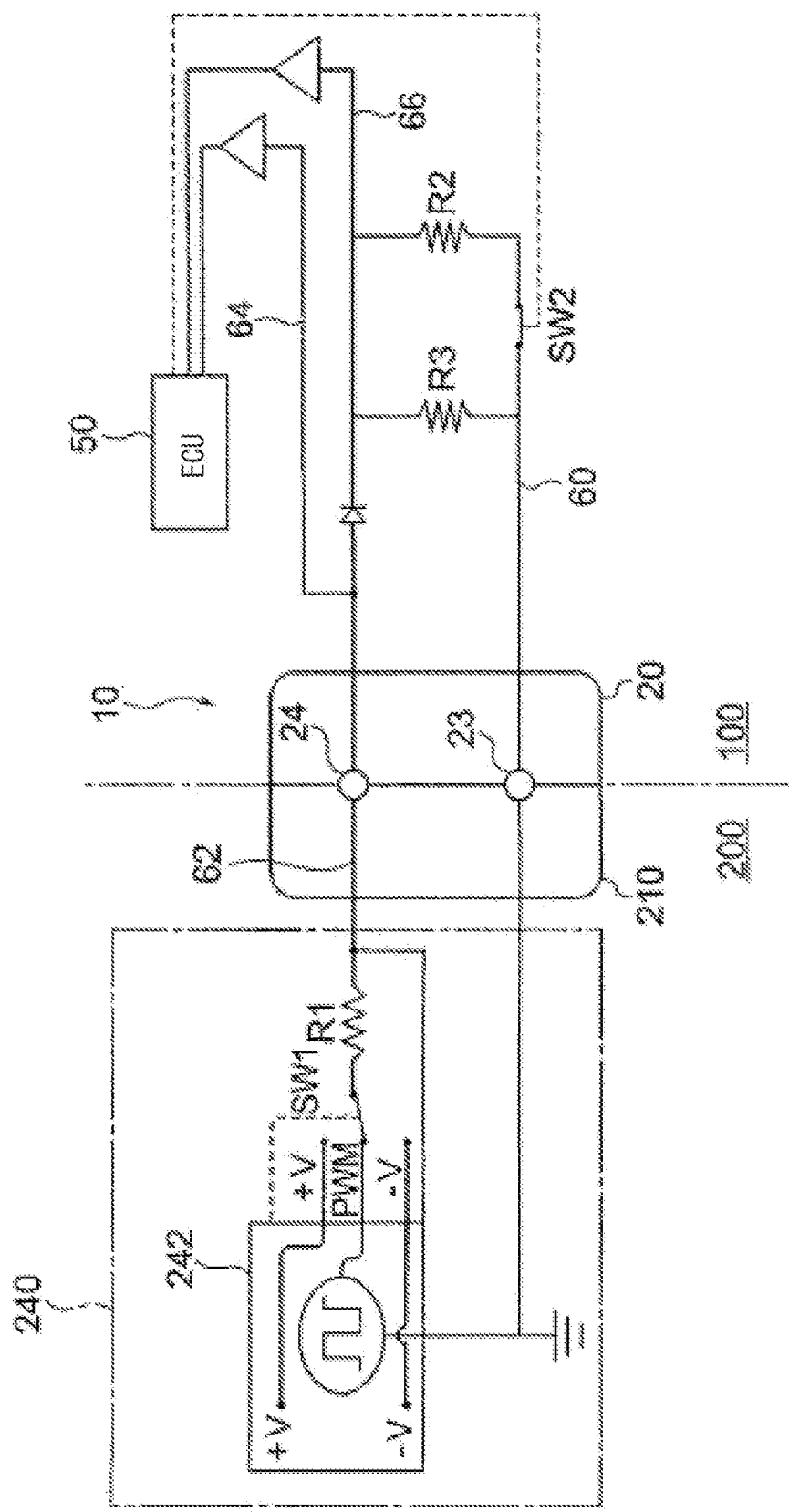
FIG. 2 is a diagram illustrating an example of a control pilot circuit in the charging system illustrated in FIG. 1.

FIG. 2 illustrates the control pilot circuit 62 in the charging system 1. The ECU 50 may receive the CPLT signal via signal lines 64 and 66 and may thus detect the coupling state of the charging cable 200. The signal lines 64 and 66 may be coupled to the CPLT signal path 60. The CPLT signal path 60 may include: resistors R2 and R3 that are coupled in parallel with each other; and a switch SW2 disposed between the resistors R2 and R3. The switch SW2 may be turned OFF upon a normal state in which the charging is not performed. The switch SW2 may be turned ON in response to a signal received from the ECU 50, in a case where the coupling of the charging cable 200 is confirmed on the basis of the CPLT signal and where the battery 42 is in a chargeable state.

In the control pilot circuit 62, the CPLT signal path 60 of the vehicle 100 may have a voltage value of 0 V in a case where the power feeding device includes a power supply and where the charging cable 200 is not coupled to the vehicle 100. The CPLT signal path 60 may have a voltage value that exceeds 0 V in a case where the vehicle 100 is coupled to the power feeding device via the charging cable 200. The ECU 50 may detect that the charging cable 200 is coupled to the vehicle 100 on the basis of a change in the voltage value.

The PISW signal path 70 may transfer the PISW signal. The PISW signal may be adapted to detect a state of mating of the charging inlet 20 and the charging connector 210. The PISW signal path 70 may structure a cable connection circuit 72 together with the connection detecting path 212 of the charging cable 200.

FIG. 3 illustrates the cable connection circuit 72 in the charging system 1. The PISW signal path 70 may have a first end coupled to a rated voltage and a second end that is grounded. The PISW signal path 70 may also have resistors R4 and R5 provided between the first end and the second end. The switch SW3 provided in the connection detecting path 212 of the charging cable 200 may be turned ON in a case where the charging connector 210 is not mated with the charging inlet 20 or in a case where the charging connector 210 is mated with the charging inlet 20. The switch SW3 may be turned OFF in a case where the charging connector 210 is mated halfway with the charging inlet 20. The ECU 50 may receive the PISW signal via a signal line 76 coupled to the PISW signal path 70 and thus detect the state of mating of the charging connector 210 with respect to the charging inlet 20. In an example embodiment, the ECU 50 may detect a divided voltage of the cable connection circuit 72 via the signal line 76, and may detect the presence of the coupling of the charging connector 210 on the basis of a thus-detected voltage value.

A description is given next, with reference to FIG. 4, of the locking mechanism 30 provided at the charging inlet 20 and of the charging lid 28 that opens and closes the charging inlet 20.

The locking mechanism 30 may lock the coupling state of the charging connector 210 coupled to the charging inlet 20. The locking mechanism 30 may include a locking pin 32, a pin driver 34, and a pin position detector 36. The locking pin 32 may have a rod shape, and engages with the charging connector 210. The pin driver 34 advances and retracts the locking pin 32 in an axial direction. The pin position detector 36 may detect a state of the advancement and the retraction of the locking pin 32. The pin driver 34 may move the locking pin 32 in an advancing direction in which an end of the locking pin 32 protrudes, in a case where the pin driver 34 receives a locking execution signal from the ECU 50. The pin driver 34 may move the locking pin 32 in a retracting direction in which the end of the locking pin 32 is retracted, in a case where the pin driver 34 receives a locking release signal from the ECU 50.

Figure 5C:
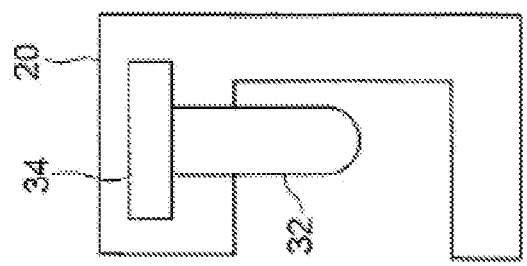
FIG. 5C is a diagram illustrating an example of a third state of the locking pin of the locking mechanism.
Figure 5B:
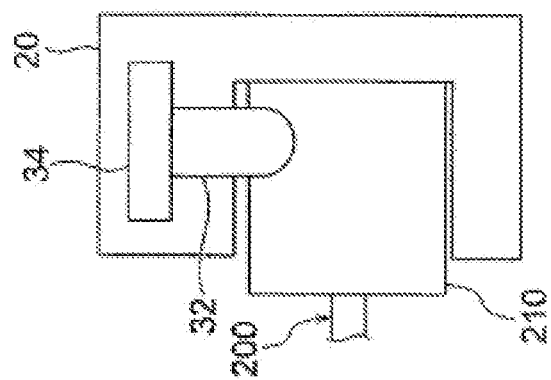
FIG. 5B is a diagram illustrating an example of a second state of the locking pin of the locking mechanism.
Figure 5A:
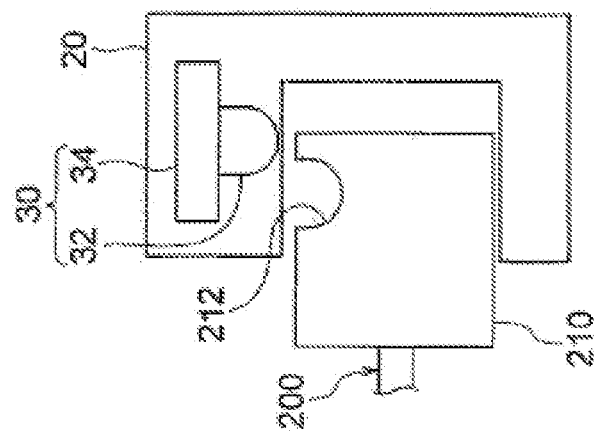
FIG. 5A is a diagram illustrating an example of a first state of a locking pin of a locking mechanism.

FIGS. 5A to 5C illustrate respective states of the locking pin 32 of the locking mechanism 30. The locking pin 32 may be moved in the retracting direction to be placed into a first state, or into an unlocked state, in which attachment of the charging connector 210 is possible as illustrated in FIG. 5A. The locking pin 32 may be moved in the advancing direction from the first state, with the charging connector 210 being coupled to the charging inlet 20, to be placed into a second state in which the locking pin 32 is positioned more in the advancing direction than the first state as illustrated in FIG. 5B. The locking pin 32 may be moved in the advancing direction from the first state, with the charging connector 210 not being coupled to the charging inlet 20, to be placed into a third state in which the locking pin 32 is positioned more in the advancing direction than the second state as illustrated in FIG. 5C.

In the second state, the end of the locking pin 32 may come into contact with the charging connector 210 and the locking pin 32 engages with the charging connector 210 accordingly. Thus, the locking pin 32 may be placed into a state in which the engagement is locked, i.e., into a locked state. In the third state, the locking pin 32 may be moved in the advancing direction with the charging connector 210 being uncoupled, and the locking pin 32 may be moved to a position that is most advanced in the advancing direction. The locking pin 32 prevents the charging connector 210 from being attached to the charging inlet 20 in the third state.

The pin position detector 36 may detect whether the locking pin 32 is in the first state, the second state, or the third state, and transmit a detection signal indicating a result of the detection to the ECU 50.

The charging lid 28 may open and close the charging inlet 20. In an example embodiment, the charging lid 28 may open and close an opening of the inlet container so provided as to be recessed from the body of the vehicle 100. The charging lid 28 may be coupled to the ECU 50, and may transmit, to the ECU 50, a detection signal indicating a result of the detection as to whether the charging lid 28 is in an open state or in a closed state.

The system starting switch 56 may place the traveling system that allows the vehicle 100 to travel into a start state. For example, the system starting switch 56 may place an electric motor as a traveling drive source and a controlling device directed to traveling into the start state. The system starting switch 56 may be provided in a vehicle compartment of the vehicle 100, and may be turned ON by the driver upon driving of the vehicle 100.

A description is given next of a method of determining the presence of the coupling of the charging connector 210 to the charging inlet 20, in the vehicle 100 having the charging connector connection determining apparatus 10.

The charging connector connection determining apparatus 10 may detect that the charging connector 210 is coupled, on the basis of the CPLT signal outputted from the CPLT signal path 60. For example, the voltage value outputted to the ECU 50 from the CPLT signal path 60 may exceed 0 V as described above in a case where the vehicle 100 is coupled to the power feeding device via the charging cable 200. The ECU 50 may detect that the charging connector 210 is coupled on the basis of the voltage value.

The charging connector connection determining apparatus 10 may also detect the presence of the coupling of the charging connector 210, on the basis of the PISW signal outputted from the PISW signal path 70. For example, the resistors R4 and R5 may be incorporated between the rated voltage of the PISW signal path 70 and a grounding point in a case where the charging connector 210 is not coupled, whereas the resistors R6 and R7 of the connection detecting path 212 may be incorporated in addition to the resistors R4 and R5 in a case where the charging connector 210 is coupled, changing the voltage value to be outputted to the ECU 50 via the signal line 76. The ECU 50 may detect the presence of the coupling of the charging connector 210 on the basis of the change in the voltage value.

However, it is not possible for the detection of the coupling of the charging connector 210 based on the CPLT signal described above to detect that the charging connector 210 is coupled even though the charging connector 210 of the charging cable 200 is coupled to the charging inlet 20, in a case where the electric power is not supplied to the control pilot circuit 62. For example, it is not possible for the detection of the coupling of the charging connector 210 based on the CPLT signal described above to detect that the charging connector 210 is coupled, in a case where the plug 220 of the charging cable 200 is not coupled to the external power supply.

Further, it is no longer possible for the detection of the coupling of the charging connector 210 based on the PISW signal to detect the presence of the coupling of the charging connector 210 on the basis of the PISW signal outputted from the ECU 50, in a case where the disconnection occurs in the PISW signal path 70 as denoted by a reference numeral 78 or 79 in FIG. 3.

As described above, the detections of the charging connector 210 based on the CPLT signal and the PISW signal can involve a case where the presence of the coupling of the charging connector 210 is not detectable. In contrast, even in such a case, the charging connector connection determining apparatus 10 according to an example embodiment makes it possible to determine the presence of the coupling of the charging connector 210 on the basis of the state of the locking pin 32 of the locking mechanism 30.

Figure 6:
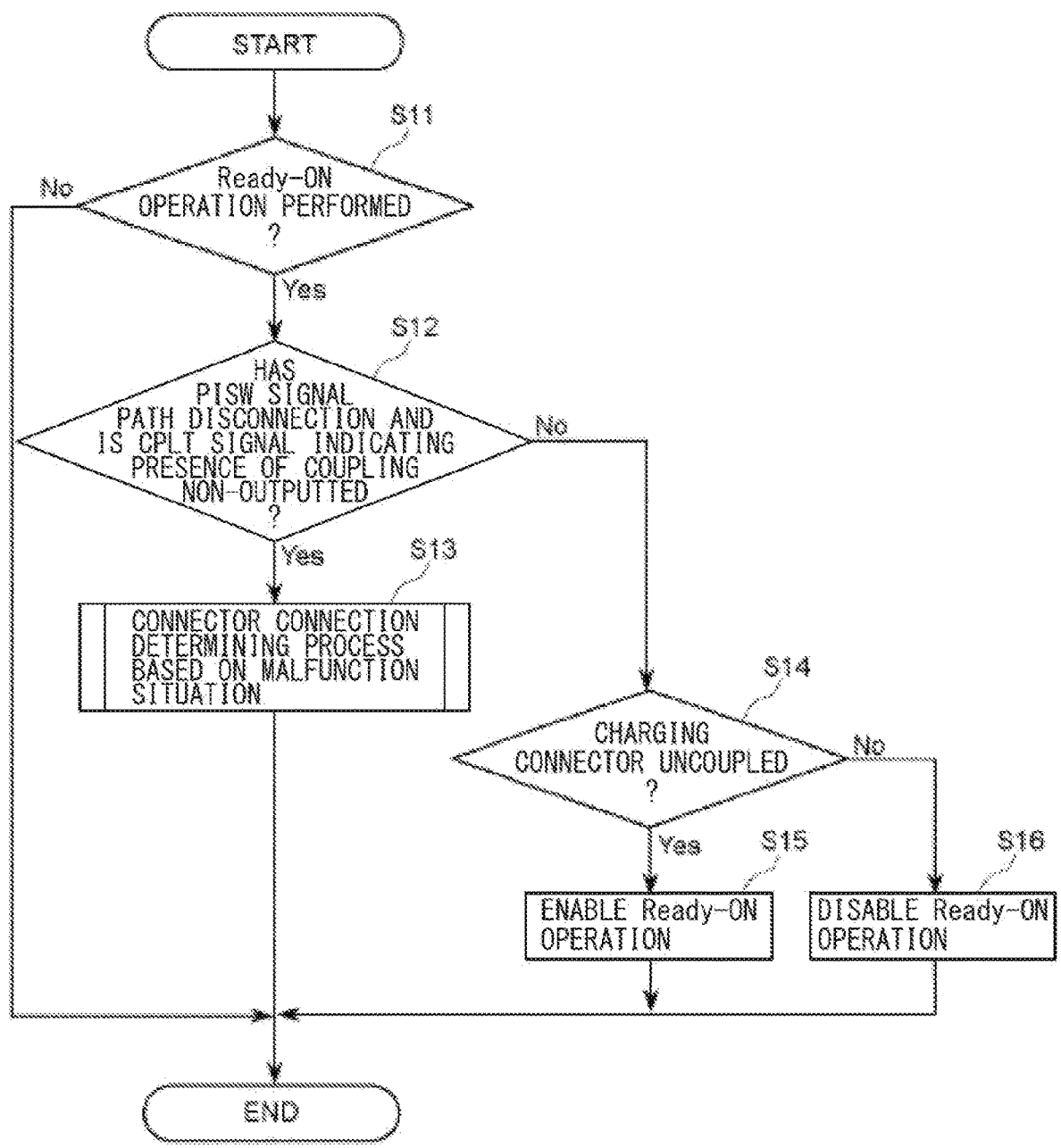
FIG. 6 is a flowchart illustrating an example of a process to be performed by ECU of the charging connector connection determining apparatus.
Figure 7:
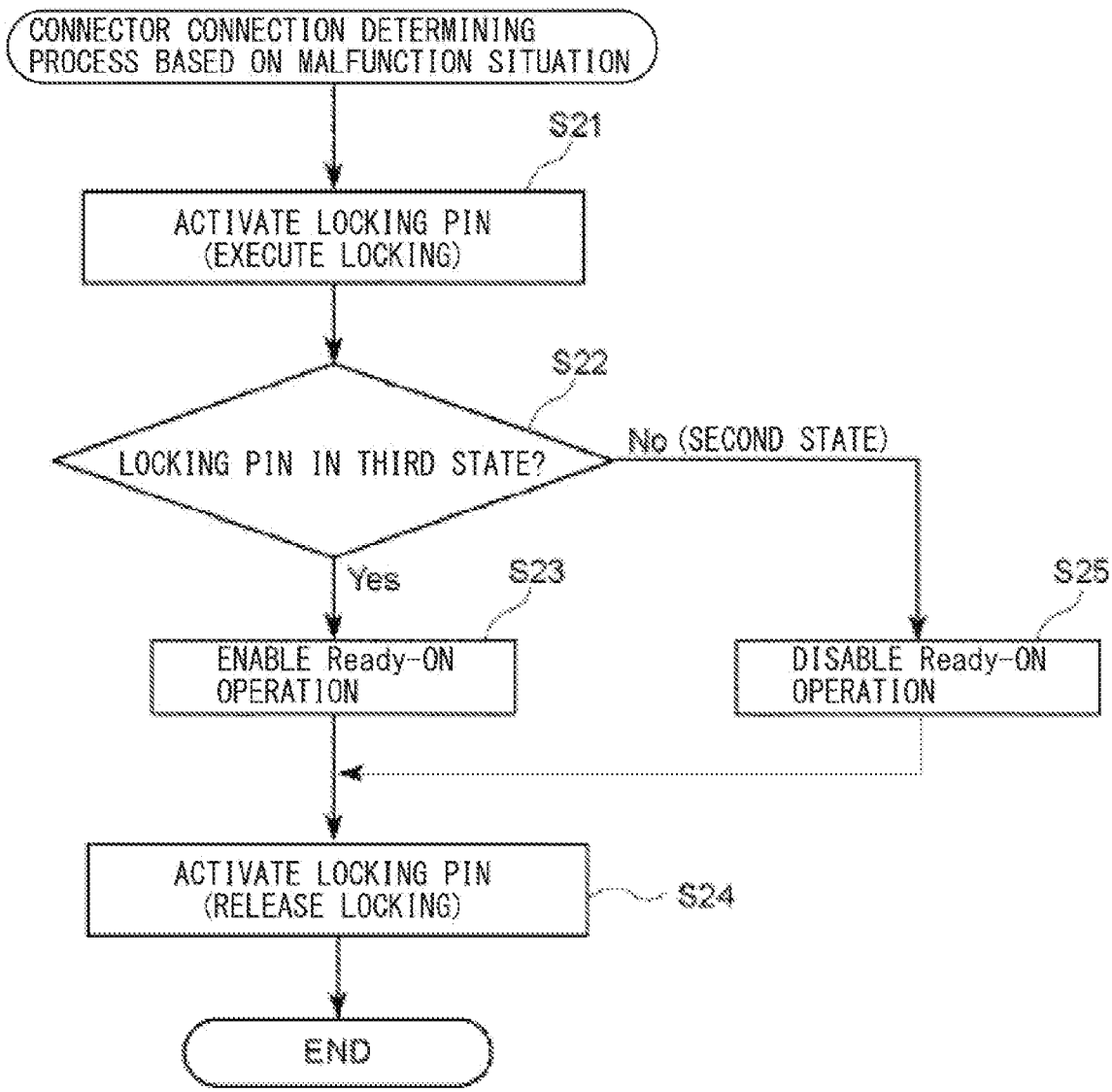
FIG. 7 is a flowchart illustrating an example of a process to be performed by the ECU of the charging connector connection determining apparatus.

FIGS. 6 and 7 are each a flowchart illustrating a charging connector connection determining method based on the locking mechanism 30, and each illustrate an example of a connector connection determining process to be performed by the ECU 50. In the following, a description is given of the connector connection determining process.

Upon the start of the process, the ECU 50 may first determine whether the system starting switch 56 is operated, i.e., whether a Ready-ON operation is performed (step S11). The ECU 50 may end the process if the Ready-ON operation is determined as not being performed (step S11: No). If the Ready-ON operation is determined as being performed (step S11: Yes), the ECU 50 may determine whether the PISW signal path 70 has the disconnection on the basis of the PISW signal, and determine whether the CPLT signal indicating that the charging cable 200 is coupled is outputted (step S12).

In step S12, if the PISW signal path 70 is determined as having no disconnection and/or where the charging cable 200 is determined on the basis of the CPLT signal as being coupled (step S12: No), the ECU 50 may determine whether the charging connector 210 is coupled to the charging inlet 20 on the basis of the PISW signal and/or the CPLT signal (step S14).

In step S14, if the charging connector 210 is determined as being uncoupled (step S14: Yes), the ECU 50 may enable the Ready-ON operation based on the system starting switch 56 (step S15), following which the ECU 50 may end the process. If the charging connector 210 is determined as being coupled (step S14: No), the ECU 50 may disable the Ready-ON operation based on the system starting switch 56 (step S16), following which the ECU 50 may end the process.

In step S12, if the PISW signal path 70 is determined as having the disconnection and where the CPLT signal indicating that the charging cable 200 is coupled is determined as being non-outputted (step S12: Yes), the ECU 50 may perform the connector connection determining process based on a malfunction situation illustrated in FIG. 7 (step S13) by determining that the PISW signal path 70 has a malfunction, following which the ECU 50 may end the process.

A description is given next of the connector connection determining process based on the malfunction situation illustrated in FIG. 7.

Upon the start of the connector connection determining process based on the malfunction situation, the ECU 50 may output the locking execution signal to the locking mechanism 30 to move the locking pin 32 in the advancing direction (step S21). Thereafter, the ECU 50 may determine whether the locking pin 32 is in the third state that prevents the connection of the charging connector 210, on the basis of the detection signal outputted from the pin position detector 36 (step S22).

In step S22, if the locking pin 32 is determined as being in the third state (step S22: Yes), the ECU 50 may enable the Ready-ON operation based on the system starting switch 56 by determining that the charging connector 210 is not coupled (step S23). Thereafter, the ECU 50 may output the locking release signal to the locking mechanism 30 to move the locking pin 32 in the retracting direction (step S24), following which the ECU 50 may end the process. By the locking release operation performed in step S24, the locking pin 32 may be placed into the first state.

In step S22, if the locking pin 32 is determined as not being in the third state, i.e., determined as being in the second state in which the locking pin 32 engages with the charging connector 210 (step S22: No), the ECU 50 may disable the Ready-ON operation based on the system starting switch 56, i.e., allows the traveling system not to be started, by determining that the charging connector 210 is coupled (step S25). Thereafter, the ECU 50 may cause the locking pin 32 to be moved in the retracting direction (step S24), following which the ECU 50 may end the process.

As described above, the charging connector connection determining apparatus 10 according to an example embodiment determines the presence of the coupling of the charging connector 210 by moving the locking pin 32 provided at the charging inlet 20 in the advancing direction and detecting the state of the locking pin 32. Hence, it is possible to prevent, with higher reliability, a drag traveling that drags the charging cable 200.

In some embodiments, the charging connector connection determining apparatus 10 may use, in combination, the determination of the coupling of the charging connector 210 based on the CPLT signal and the PISW signal. Thus, it is possible to reduce the number of times of performing the determination of the coupling of the charging connector 210 based on the locking mechanism 30 and to reduce the number of times of activating the locking pin 32. Hence, it is possible to increase durability of a component part.

In some embodiments, the ECU 50 may display a warning indicating that the charging connector 210 is coupled, in a case where the Ready-ON operation is performed and where the charging connector 210 is determined as being coupled. For example, the ECU 50 may display the warning on a meter display provided at the front of a driver's seat of the vehicle 100.

Figure 8:
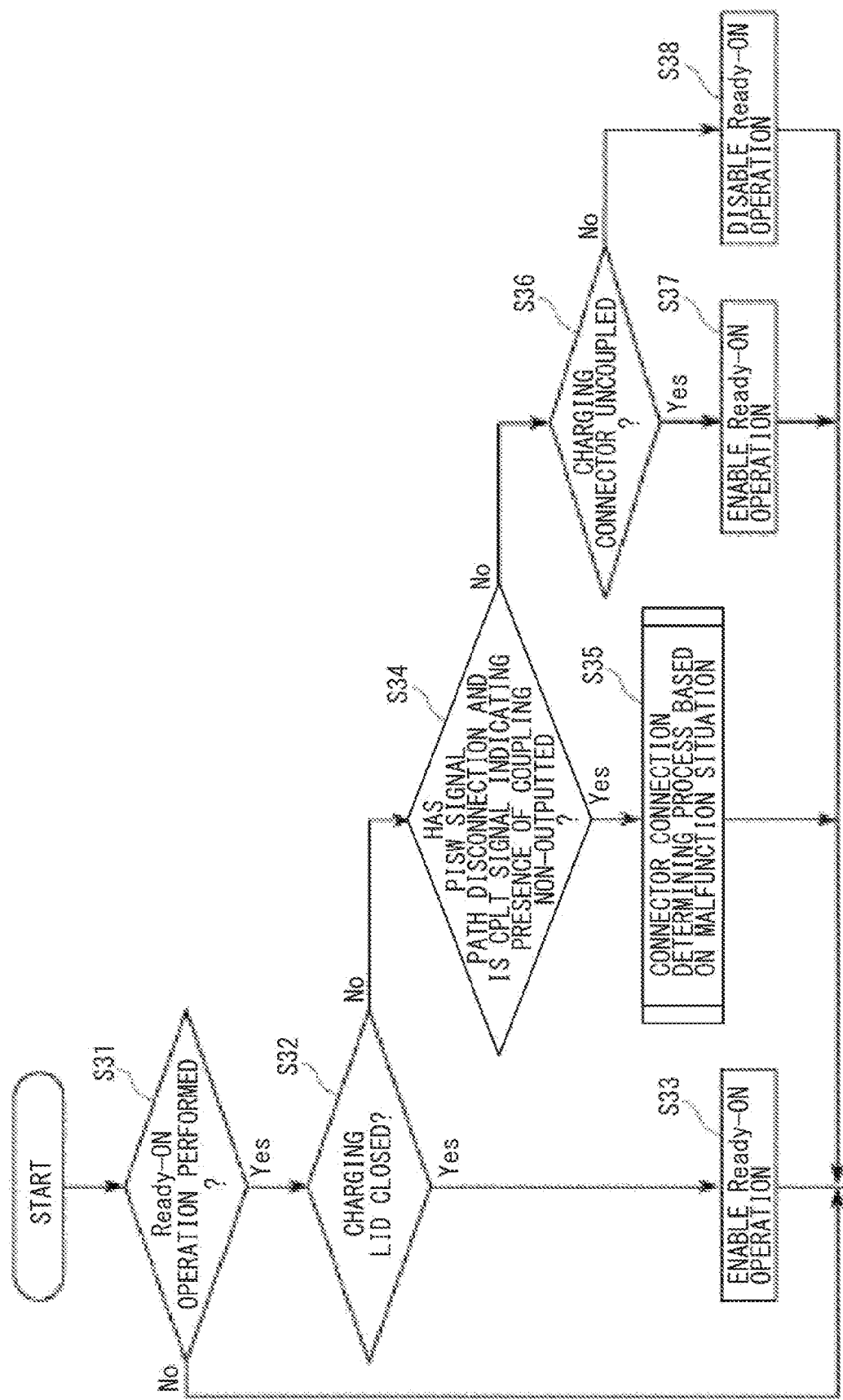
FIG. 8 is a flowchart illustrating an example of a process to be performed by the ECU of the charging connector connection determining apparatus.

A description is given, with reference to FIG. 8, of the method of determining the coupling of the charging connector 210 performed by the charging connector connection determining apparatus 10 according to another example embodiment. FIG. 8 is a flowchart illustrating a process to be performed by the ECU 50 of the charging connector connection determining apparatus 10.

Upon the start of the process, the ECU 50 may first determine whether the system starting switch 56 is operated, i.e., whether the Ready-ON operation is performed (step S31). The ECU 50 may end the process if the Ready-ON operation is determined as not being performed (step S31: No). If the Ready-ON operation is determined as being performed (step S31: Yes), the ECU 50 may determine whether the charging lid 28 is closed (step S32).

In step S32, if the charging lid 28 is determined as being in the closed state (step S32: Yes), the ECU 50 may enable the Ready-ON operation by determining that the charging connector 210 is not coupled (step S33), following which the ECU 50 may end the process.

In step S32, if the charging lid 28 is determined as being in the open state (step S32: No), the ECU 50 may determine whether the PISW signal path 70 has the disconnection on the basis of the PISW signal, and determine whether the CPLT signal indicating that the charging cable 200 is coupled is outputted (step S32).

In step S34, if the PISW signal path 70 is determined as having no disconnection and/or where the charging cable 200 is determined on the basis of the CPLT signal as being coupled (step S34: No), the ECU 50 may determine whether the charging connector 210 is coupled to the charging inlet 20 on the basis of the PISW signal and/or the CPLT signal (step S36).

In step S36, if the charging connector 210 is determined as being uncoupled (step S36: Yes), the ECU 50 may enable the Ready-ON operation (step S37), following which the ECU 50 may end the process. If the charging connector 210 is determined as being coupled (step S36: No), the ECU 50 may disable the Ready-ON operation (step S38), following which the ECU 50 may end the process.

In step S34, if the PISW signal path 70 is determined as having the disconnection and where the CPLT signal indicating that the charging cable 200 is coupled is determined as being non-outputted (step S34: Yes), the ECU 50 may perform the connector connection determining process based on the malfunction situation illustrated in FIG. 7 (step S35) by determining that the PISW signal path 70 has a malfunction, following which the ECU 50 may end the process. The connector connection determining process based on the malfunction situation may be similar to that described in the foregoing example embodiment and will not be described in detail.

As described above, whether the charging lid 28 is in the open state or the closed state may be detected, and the determination of the coupling of the charging connector 210 based on the PISW signal and the CPLT signal may be performed only in a case where the charging lid 28 is determined as being open. Further, the determination of the coupling of the charging connector 210 based on the locking mechanism 30 may be performed in a case where the determination based on those signals is not possible. Hence, it is possible to further reduce the number of times of activating the locking pin 32.

Although some example embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, in some embodiments, the charging connector connection determining apparatus 10 may not have the control pilot signal path 60 and the cable connection signal path 70. In such example embodiments, the locking pin 32 may be moved in a locking direction in a case where, for example, the operation of activating the system starting switch 56 is performed to thereby determine the presence of the coupling of the charging connector 210 on the basis of the state of the locking pin 32. Alternatively, in some embodiments, the determination of the coupling of the charging connector 210 may be performed at a predetermined timing set in advance by the ECU 50.

In an example embodiment described above, the charging cable 200 may be attachable to and detachable from the external power supply by means of the plug 220. In some embodiments, the charging cable 200 may not have the plug 220, and may be always coupled to the external power supply.

The charging connector connection determining method or the charging connector connection determining apparatus according to at least one embodiment of the technology makes it possible to determine the presence of coupling of the charging connector to the electric vehicle with higher reliability.

According to at least one embodiment of the technology, it is possible to determine the presence of the coupling of the charging connector, by moving the locking pin provided at the charging inlet of the electric vehicle in the advancing direction and detecting the state of the locking pin. Upon moving the locking pin in the advancing direction, the locking pin is placed into the second state in which the locking pin is engaged with the charging connector, in a case where the charging connector is coupled to the charging inlet. The locking pin is placed into the third state in which the locking pin is moved more in the advancing direction than the second state, in a case where the charging connector is not coupled to the charging inlet. Hence, by detecting the state of the locking pin provided at the charging inlet, it is possible to determine the presence of the coupling of the charging connector with higher reliability.

In some embodiments, it is possible to reduce the number of times of activating the locking pin to determine the presence of the coupling of the charging connector. Hence, it is possible to increase durability of a component part.

According to at least one embodiment of the technology, it is possible to determine the presence of the coupling of the charging connector, by activating the pin driver to move the locking pin provided at the charging inlet of the electric vehicle in the advancing direction and detecting the state of the locking pin. Upon moving the locking pin in the advancing direction by activating the pin driver, the locking pin is placed into the second state in which the locking pin is engaged with the charging connector, in a case where the charging connector is coupled to the charging inlet. The locking pin is placed into the third state in which the locking pin is moved more in the advancing direction than the second state, in a case where the charging connector is not coupled to the charging inlet. Hence, by detecting the state of the locking pin provided at the charging inlet, it is possible to determine the presence of the coupling of the charging connector with higher reliability.

In some embodiments, the processor of the charging connector connection determining apparatus may determine the presence of the coupling of the charging connector, in a case where the coupling of the charging cable is not detected on the basis of the control pilot signal, where the cable connection signal path is determined as having the disconnection or a ground fault on the basis of the cable connection signal, where an operation that allows for traveling of the electric vehicle is determined as being performed, and where the charging lid that opens and closes the charging inlet is determined as being in the open state.

With this configuration, it is possible to reduce the number of times of activating the locking pin to determine the presence of the coupling of the charging connector. Hence, it is possible to increase durability of a component part.

The ECU 50 illustrated in FIGS. 1 to 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the ECU 50. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the ECU 50 illustrated in FIGS. 1 to 3.

The invention claimed is:

1. A charging connector connection determining method comprising:
checking signals output from a control pilot signal path and a cable connection signal path when detecting an operation to be ready to drive an electric vehicle,
the control pilot signal path being a first circuit configured to couple an electric vehicle with a control unit of an external power supply via a charging inlet, of the electric vehicle, coupled with a charging connector from the external power supply, the first circuit configured to allow communication between the electric vehicle and the control unit, and
the cable connection signal path being a second circuit configured to output a signal depending on a connection status between the charging inlet and the charging connector;
determining presence of coupling of the charging connector to the charging inlet on a basis of a state of a locking pin provided at the charging inlet when detecting no signal output from the control pilot signal path and a break in the cable connection signal path on a basis of a signal output from the second circuit,
the locking pin being configured to be advanced and retracted in an axial direction and engage with the charging connector to lock an engagement between the locking pin and the charging connector,
the charging connector being provided at an end of a charging cable, wherein
the locking pin is configured to move to be in
a first state that allows for attachment of the charging connector to the charging inlet,
a second state in which the locking pin is positioned more in an advancing direction than the first direction to be engaged with the charging connector, and
a third state in which the locking pin is positioned more in the advancing direction than the second state and prevents the charging connector from being attached to the charging inlet; and
determining to enable the operation when detecting that the locking pin is in the second state.

2. The charging connector connection determining method according to claim 1, wherein
the control pilot signal path is configured to output a control pilot signal to a processor provided in the electric vehicle, the control pilot signal being configured to detect a state of the coupling of the charging cable, and the cable connection signal path is configured to output the signal of the cable connection signal path to the, and the determining the presence of the coupling of the charging connector to the charging inlet is performed, in a case where the coupling of the charging cable is not detected on a basis of the control pilot signal, where the cable connection signal path is determined as having a disconnection or a ground fault on a basis of the cable connection signal, and where an operation that allows for traveling of the electric vehicle is performed.

3. The charging connector connection determining method according to claim 2, wherein the determining the presence of the coupling of the charging connector to the charging inlet is performed, in a case where the coupling of the charging cable is not detected on the basis of the control pilot signal, where the cable connection signal path is determined as having the disconnection or the ground fault on the basis of the cable connection signal, where the operation that allows for the traveling of the electric vehicle is performed, and where a charging lid that opens and closes the charging inlet is in an open state.

4. The charging connector connection determining method according to claim 1, wherein
determining to disable the operation when detecting that the locking pin is the third state.

5. The charging connector connection determining apparatus according to claim 1, wherein
the processor is configured to determine to disable the operation when detecting that the locking pin is the third state.

6. A charging connector connection determining apparatus of an electric vehicle, the charging connector connection determining apparatus comprising:
a locking pin provided at a charging inlet of the electric vehicle, and configured to be advanced and retracted in an axial direction and engage with a charging connector provided at an end of a charging cable to lock an engagement between the locking pin and the charging connector;
a pin driver configured to advance and retract the locking pin; and
a processor coupled to the pin driver, wherein
the locking pin is configured to move to be in a first state that allows for attachment of the charging connector to the charging inlet, a second state in which the locking pin is positioned more in an advancing direction than the first direction to be engaged with the charging connector, and a third state in which the locking pin is positioned more in the advancing direction than the second state and prevents the charging connector from being attached to the charging inlet, and the processor is configured to:
check signals output from a control pilot signal path and a cable connection signal path when detecting an operation to be ready to drive an electric vehicle,
the control pilot signal path being a first circuit configured to couple the electric vehicle with a control unit of an external power supply via a charging inlet of the electric vehicle, coupled with a charging connector from the external power supply, the first circuit configured to allow communication between the electric vehicle and the control unit, and
the cable connection signal path being a second circuit configured to output a signal depending on a connection status between the charging inlet and the charging connector;
determine presence of the coupling of the charging connector to the charging inlet on a basis of a state of a locking pin provided at the charging inlet when detecting no signal output from the control pilot signal path and a break in the cable connection signal path on a basis of a signal output from the second circuit; and
determine to enable the operation when detecting that the locking pin is in the second state.

7. The charging connector connection determining apparatus according to claim 6, wherein
the control pilot signal path is configured to output a control pilot signal to the processor, the control pilot signal being configured to detect a state of the coupling of the charging cable; and
the cable connection signal path is configured to output the signal of the cable connection signal path to the processor, and
the processor is configured to determine the presence of the coupling of the charging connector to the charging inlet, in a case where the coupling of the charging cable is not detected on a basis of the control pilot signal, where the cable connection signal path is determined as having a disconnection or a ground fault on a basis of the cable connection signal, and where an operation that allows for traveling of the electric vehicle is determined as being performed.

\* \* \* \* \*